United States Patent [19]

van Putten

[11] Patent Number: 4,548,077

[45] Date of Patent: Oct. 22, 1985

[54] AMBIENT TEMPERATURE COMPENSATED DOUBLE BRIDGE ANEMOMETER

[76] Inventor: Antonius F. P. van Putten, Sparrenlaan 90, 5553 CZ Valkenswaard, Netherlands

[21] Appl. No.: 588,937

[22] Filed: Mar. 13, 1984

[30] Foreign Application Priority Data

Mar. 18, 1983 [EP] European Pat. Off. ........ 83200379.2

[51] Int. Cl.$^4$ ................................................ G01F 1/68
[52] U.S. Cl. ...................................................... 73/204
[58] Field of Search ........................................... 73/204

[56] References Cited

U.S. PATENT DOCUMENTS 3,429,178  2/1969  Durbin .................................. 73/204
3,996,799  12/1976  van Putten ........................... 73/204

Primary Examiner—Herbert Goldstein
Attorney, Agent, or Firm—Louis Orenbuch

[57] ABSTRACT

A hot film bridge type flow measuring device having improved compensation for ambient temperature changes employs a chip on which two electrical bridges are situated. Each bridge has at least two of its arms formed by hot film temperature sensitive resistors. The resistors of the two bridges are disposed in parallel pairs on the chip but one bridge faces 90° with respect to the other bridge. The output of each bridge is fed to the input of its own differential amplifier and the outputs of those differential amplifiers provide the inputs to a third differential amplifier.

5 Claims, 3 Drawing Figures 4,548,077

AMBIENT TEMPERATURE COMPENSATED DOUBLE BRIDGE ANEMOMETER

FIELD OF THE INVENTION

This invention relates in general to the measurement of the velocity of a flowing medium. More particularly the invention pertains to an improvement in compensating a flow velocity measuring device of the hot film type for changes in ambient temperature.

BACKGROUND OF THE INVENTION

A hot film bridge type device for measuring flow velocity is described in U.S. Pat. No. 3,996,799. That device employs a chip on which two elongate temperature sensitive hot film resistors are situated with their longitudinal axes forming a 90° angle. Two other resistors which are also situated on the chip form a bridge with the two temperature sensitive resistors. The bridge is energized in the conventional manner by connecting two opposed junctions of the bridge arms to a source of electrical power. The other two opposed junctions of the bridge arms are connected to the input of a differential amplifier to provide the measurement signal.

As stated in U.S. Pat. No. 3,996,799 in column 2, lines 47 to 55, in most instances four perfectly identical resistors cannot be made on the chip and, consequently it is necessary for precise measurement, to provide compensation for changes in ambient temperature because all four resistors do not respond identically to temperature changes. That U.S. patent describes an arrangement for providing compensation for ambient temperature changes by deriving a temperature dependent signal from one of the resistors and adding it as a compensating signal to the measurement signal. In that compensation arrangement, a second differential amplifier obtains its input from one of the bridge resistors and the outputs of both differential amplifier are summed by a third amplifier.

The ambient temperature compensation arrangment of U.S. Pat. No. 3,996,799 works satisfactorily in most situations but it has been found that that arrangement does not provide full compensation for ambient temperature changes where the flow velocity to be measured is very low.

PRINCIPAL OBJECT OF THE INVENTION

The principal object of the invention is to provide a hot film bridge type ambient temperature compensated velocity measuring device which has as good or better performance over a broader range of flow velocities than prior art devices of that type.

SUMMARY OF THE INVENTION

The device of the invention is an improvement upon hot film bridge type velocity measuring devices and employs a second bridge having two elongate hot film temperature sensitive resistors whose characteristics closely match those of the temperature sensitive resistors of the first bridge. Those other two resistors are disposed on the chip parallel to the temperature sensitive resistors in the first bridge and are connected with other resistive elements to form the second bridge. Both bridges are connected to the same power source and each bridge has its output fed to the input of its own differential amplifier. The two bridges have similar unbalance characteristics under no-flow conditions and the outputs of their differential amplifiers provide the inputs to a third differential amplifier. The preferred arrangment of the resistors is such that the output terminals of each bridge are adjacent to the power input terminals of the other bridge.

As a consequence of this arrangement, the inputs of the first and second differential amplifier are, under flow conditions, supplied with signals whose polarities are different, resulting in a signal at the output of the third amplifier that represents the flow velocity. Inasmuch as the bridge unbalance under no-flow conditions at constant or changing ambient temperature is similar for the two bridges, the inputs of the first and second differential amplifiers are supplied with signals of the same polarity so that the resulting output signals of those amplifiers cancel out at the third differential amplifier. There is consequently, no, or very little, error in the measurement signal arising from ambient temperature changes and sensitivity is therefore greatly enhanced at very low flow velocities.

Preferably the chip is a silicon substrate on which the first and second differential amplifiers are made as integrated circuits in the space not occupied by the bridge resistors. Where space is available on the chip, it is preferred to have the third differential amplifier also made as an integrated circuit on the chip.

The requirement that the two bridges have similar unbalance characteristics under no-flow conditions can be met by selecting suitable chips with resistors from a manufacturing run, accepting the one that meet the requirement and rejecting the others. However, it is also possible to obtain the requisite similar unbalance characteristic by controlled doping of the semiconductor material during manufacture.

THE DRAWINGS

DETAILED DESCRIPTION OF THE INVENTION

Figure 1:
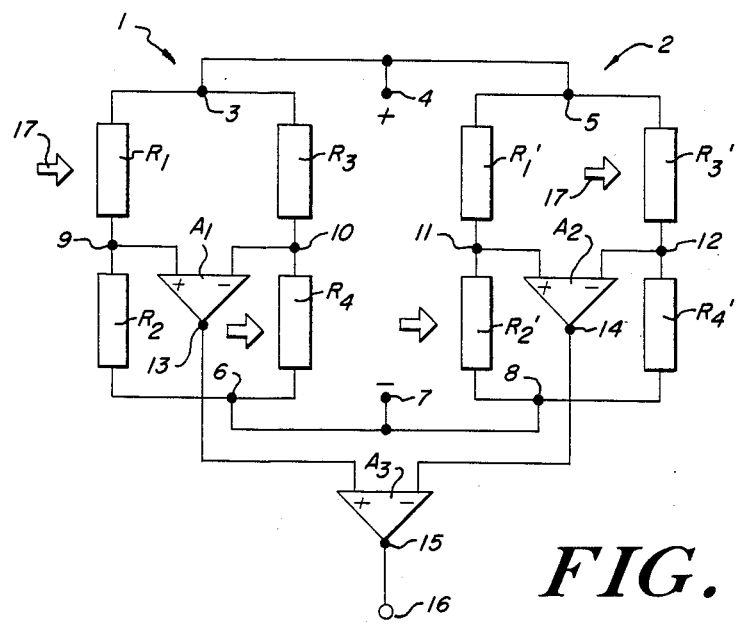
FIG. 1 shows the scheme of the invention.

FIG. 1 schematically shows two bridge circuits. The first bridge, designated by reference numeral 1, is comprised of resistors R1, R2, R3 and R4. The second bridge, designated by numeral 2, is comprised of resistors R1', R2', R3' and R4'.

Junction 3 of the resistors R1 and R3 of bridge 1 is connected to terminal 4, to which is also connected junction 5 of the resistors R1' and R3'. Junction 6 of the resistors R2 and R4 is connected to terminal 7 to which is also connected junction 8 of the resistors R2' and R4'. Terminals 4 and 7 are connected to a suitable power source with terminal 4 being indicated as the positive (+) terminal and terminal 7 being indicated as the negative (−) terminal.

The output signal of bridge 1 is fed to amplifier A1 and for that purpose the junction 9 of resistors R1 and R2 is connected to the non-inverting input (+) of amplifier A1 while junction 10 of resistors R3 and R4 is connected to the inverting (−) input of that amplifier. In the same manner, the output signal of bridge 2 is fed to amplifier A2, the junction 11 of resistors R1' and R2' being connected to the +input of amplifier A2 and the junction 12 of resistors R3' and R4' being connected to the −input of amplifier A2.

The output 13 of amplifier A1 is coupled to the noninverting input of amplifier A3 while the output 14 of amplifier A2 is coupled to the inverting input of amplifier A3. The output 15 of amplifier A3 is connected to a terminal 16 at which the measurement signal appears.

Figure 2:
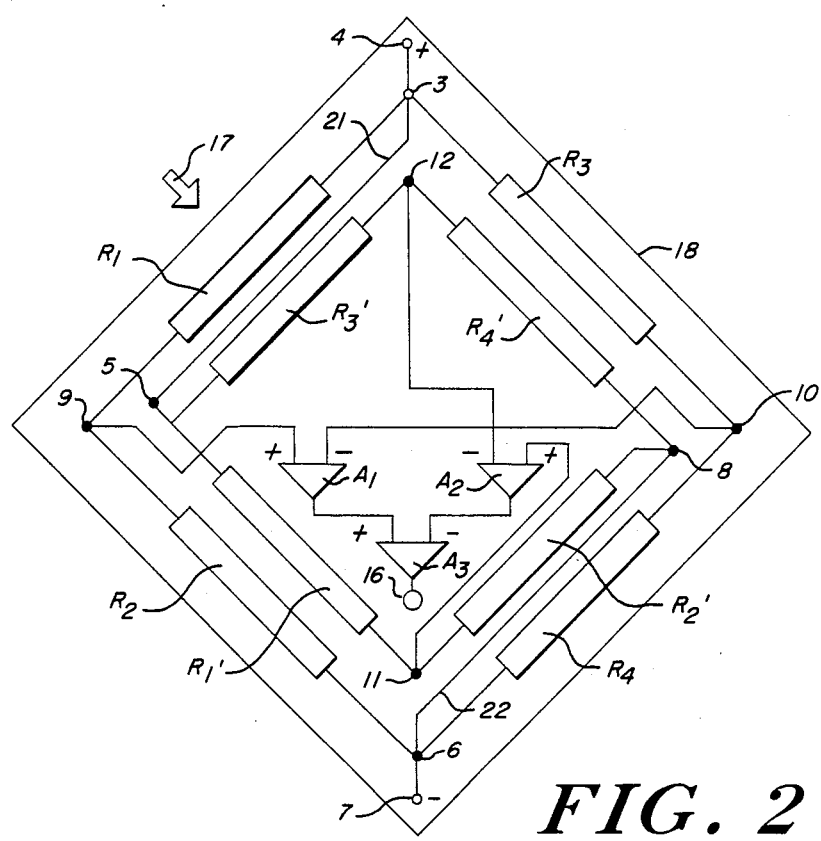
FIG. 2 is an enlarged plan view of a semiconductor chip arranged in accordance with the invention with the resistors and amplifiers schematically shown on the chip.
Figure 3:
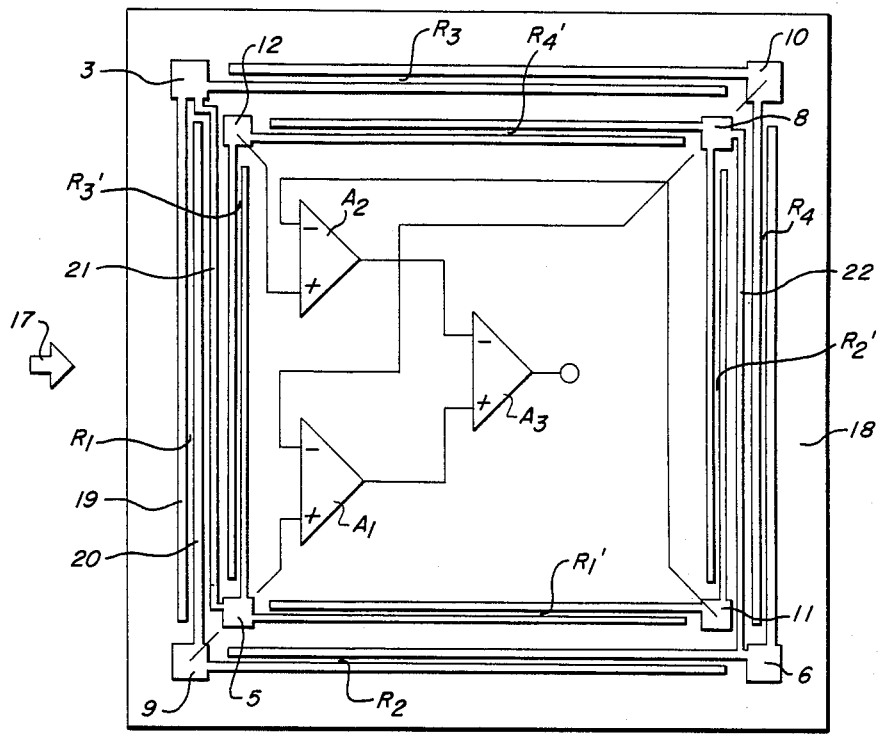
FIG. 3 is an enlarged plan view of the preferred embodiment of the invention constructed as a unitary chip.

As shown in FIGS. 2 and 3, the resistors are arranged on the semiconductor chip 18 so that resistors R1 and R4 as well as sensing resistors R2' and R3' lie perpendicular to the direction of flow, indicated by the arrow 17. The disposition of the resistors on the chip is schematically illustrated in FIG. 2; the direction of flow is indicated in FIGS. 1, 2, and 3 by the arrow 17.

The unbalance bridge signal results from the transfer of heat from the hot film resistors to the medium which flows past them and the bridge unbalance is caused by the greater transfer of heat from resistors that are normal to the flow (in this case the resistors R1, R4, R2' and R3') than for the resistors that are parallel to the flow (the resistors R2, R3, R1' and R4'). As discussed in U.S. Pat. No. 3,996,799, the heat transfer characteristics are generally represented by the formula $Nu = A + Q \phi(\alpha)$ in which Nu is the Nusselt number for total heat transfer, A is a structure-dependent constant associated with nonflow-dependent heat losses, Q is the flow-dependent forced-convection heat transfer and $\phi(\alpha)$ is a function that accounts for the dependence of the heat flow on the angle $\alpha$ between the normal to the diffused resistor and the direction of the flow. The principle of the sensor is thus based on the difference $\phi(\alpha)$ between the parallel and the normal resistors. To keep the term A, which is mainly a result of heat conduction within the substrate, as small as possible, a chip is used with a thickness of 50um. Because of boundary layer effects, the heat transfer of the sensing resistors of the inner bridge is somewhat smaller than the heat transfer of the resistors of the outer bridge but as the output signals of those bridges are added this is of no consequence.

Under flow conditions, the resistive values of the resistors R1 and R4, R2' and R3' decrease. This causes point 9 to go positive and point 10 to go negative, resulting in a positive output signal at the output 13 of amplifier A1. It also causes point 11 to go negative and point 12 to go positive, resulting in a negative output signal on terminal 14 of amplifier A2. Because the output of amplifier A1 is fed to the positive input of amplifier A3 and the output 14 of amplifier A2 is fed to the negative input of amplifier A3, a positive signal, representing the measured flow velocity, appears at the output 15 of amplifier A3 and at terminal 16 of the device.

For changes in ambient temperature the situation is different. As stated previously, the resistors must be such that both bridges have the same unbalance characteristics under no flow conditions. With no flow present, point 9, for instance, is arranged to be slightly positive with respect to point 10 and point 11 is similarly arranged to be slightly positive with respect to point 12. As a result, under no flow conditions, the output signals of amplifiers A1 and A2 are both slightly positive and consequently the + and − inputs of amplifier A3 are fed with positive signals that cancel each other out. As a result, the output signal of amplifier A3 is zero or very nearly zero so that the influence of the ambient temperature is very small indeed.

It will be appreciated that the same way the influence of ambient temperature under no flow condition is compensated, the described configuration also compensates for changes in temperature of the flowing medium under flow conditions.

FIG. 3 is an enlarged plan view showing the arrangement of the resistors of bridges 1 and 2 and the amplifiers on a single silicon chip. The silicon chip 18 carries eight p-type diffused resistors, R1 thru R4 and R1' thru R4'. Those diffused resistors can be made by conventional planar technology. Each of those resistors is situated between a pair of parallel leads. For example, resistor R1 is disposed between and abuts the parallel leads 19 and 20. In FIG. 3, the eight contact areas or pads are designated by the same reference numerals as the common points in FIGS. 1 and 2. The resistors R1 and R3' on the one hand and R2' and R4 on the other hand are disposed normal to the flow direction (indicated by arrow 17). The pad 3 of the outer bridge is connected by lead 21 to the corresponding pad 5 of the inner bridge. Similarly, pad 6 of the outer bridge is connected by lead 22 to the corresponding pad 8 of the inner bridge. Thus it can be appreciated that the inner bridge is turned through 90° relative to the outer bridge.

Preferably corresponding resistors of the two bridges have the same ohmic value. The length of the resistors in the inner bridge is, as shown in FIG. 3, necessarily somewhat shorter than the length of the resistors in the outer bridge. However, the resistance of each resistor is determined by the width to length ratio (or the amount of unit squares of area A connected in parallel). Consequently, using a fixed scaling factor in the design of the chip enables the width to length ratio to be held constant and thus offers an easy method of obtaining resistors with the same ohmic value.

I claim:
1. An ambient temperature compensated device for measuring the flow velocity of a fluid, comprising
   (i) a semiconductor substrate,
   (ii) a first electrical bridge disposed on the substrate, the first bridge having four arms in rectangular disposition, each of the arms having in it an elongate hot film temperature sensitive resistor, the first bridge having connections extending from two of its opposed corners for applying electrical power to the bridge and having connections extending from its two other opposed corners to enable sensing of bridge balance;
   (iii) a second electrical bridge disposed on the substrate, the second electrical bridge being similar to the first bridge, the second bridge having its resistors close to and extending side by side with the resistors of the first bridge, the connections for applying electrical power to the second bridge and the connections for enabling sensing of bridge balance extending from corners of the second bridge which are at 90° relative to the corresponding corner connections of the first bridge;
   (iv) means for sensing imbalance of the first bridge and providing a first output signal in response thereto;
   (v) means for sensing imbalance of the second bridge and providing a second output signal in response thereto; and
   (vi) means responsive to said first and second signals for deriving therefrom a third output signal that is a measure of fluid velocity.
2. The ambient temperature compensated device according to claim 1, wherein
   the hot film temperature sensitive resistors are diffused into the semiconductor material of the substrate.

3. The ambient temperature compensated device according to claim 2, wherein all the resistors in the arms of both bridges have substantially identical electrical and thermal characteristics.

4. The ambient temperature compensated device according to claim 3, wherein the means for sensing imbalance of the first and second bridges are differential amplifiers formed in the semiconductor material of the substrate.

5. The ambient temperature compensated device according to claim 1, wherein the second bridge is disposed within and adjacent to the first bridge, and the device further includes means connecting both bridges for enabling both bridges to be energized from a common power source.

* * * * *